United States Patent
Yu et al.

(10) Patent No.: US 9,796,815 B2
(45) Date of Patent: Oct. 24, 2017

(54) PROCESS FOR PREPARING POLYCARBAMATE AND REACTION PRODUCT THEREOF

(71) Applicant: Dow Global Technologies LLC, Midland, MI (US)

(72) Inventors: Xinrui Yu, Midland, MI (US); Yiyong He, Midland, MI (US); John W. Hull, Jr., Midland, MI (US); Paul Foley, Traverse City, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/955,507

(22) Filed: Jul. 31, 2013

(65) Prior Publication Data

US 2015/0038670 A1    Feb. 5, 2015

(51) Int. Cl.
*C08G 71/04* (2006.01)
*C08G 65/333* (2006.01)

(52) U.S. Cl.
CPC ....... *C08G 71/04* (2013.01); *C08G 65/33303* (2013.01)

(58) Field of Classification Search
CPC .................................................. C08G 71/04
See application file for complete search history.

(56) References Cited

U.S. PATENT DOCUMENTS

| | | | | | |
|---|---|---|---|---|---|
| 2,956,964 | A | * | 10/1960 | Christenson et al. | ... 106/169.47 |
| 3,387,059 | A | * | 6/1968 | Pajot | ............... 525/508 |
| 4,963,643 | A | * | 10/1990 | Maresca et al. | ............... 528/211 |
| 5,008,103 | A | * | 4/1991 | Raleigh et al. | ................. 424/66 |
| 5,189,117 | A | * | 2/1993 | Hefner, Jr. | ..................... 525/460 |
| 5,795,934 | A | * | 8/1998 | Parks | ............................ 525/54.3 |
| 6,444,718 | B1 | * | 9/2002 | Blount | ............................ 521/94 |

OTHER PUBLICATIONS

Barton et al (Chemical Reaction Hazards, Second Edition, Institution of Chemical Engineers, 1997, pp. 106-107).*
Mannan (Lee's Loss Prevention in the Process Industries, vol. 1, 3rd Ed, 2005, pp. 13/14-13/17).*
Kenneth D.M. Harris, "Fundamental and Applied Aspects of Urea and Thiourea Inclusion Compounds," Supramolecular Chem., Jan.-Mar. 2007, vol. 19 (1-2), pp. 47-53.
EP Office Action dated Mar. 17, 2016; from EP counterpart Application No. 14750132.4.

* cited by examiner

*Primary Examiner* — Rachel Kahn

(57) ABSTRACT

A first process to produce polycarbamate comprising providing urea in liquid form; and adding the liquid urea to a polyol is provided. A second process for producing polycarbamate comprising adding solid urea to a polyol in liquid form to form a reaction mixture is provided. Also provided is a reaction product produced by the first process or second process.

5 Claims, No Drawings

PROCESS FOR PREPARING POLYCARBAMATE AND REACTION PRODUCT THEREOF

FIELD OF INVENTION

The instant invention relates to a process for preparing polycarbamate and a reaction product thereof.

BACKGROUND OF THE INVENTION

Polyurethane is a polymer composed of a chain of organic units with carbamate linkages. Polyurethanes may be produced using isocyanate as a starting material. However, trace amounts of residual isocyanates raise health and safety concerns. As an alternative, polyurethanes have been produced using polyols and methyl carbamate as the starting materials. Methyl carbamate, however, also gives rise to health and safety concerns. There remains a need for alternative polyurethane production methods which provide polyurethanes useful in a variety of applications while minimizing health and safety concerns.

SUMMARY OF THE INVENTION

The instant invention is a process for preparing a polycarbamate and a reaction product thereof.

In one embodiment, the instant invention provides a first process to produce polycarbamate comprising: providing urea in liquid form; and adding the liquid urea to a polyol. In an alternative embodiment, the instant invention provides a second process to produce polycarbamate comprising: adding solid urea to a polyol in liquid form to form a reaction mixture.

DETAILED DESCRIPTION OF THE INVENTION

The instant invention is a process for preparing a polycarbamate and a reaction product thereof.

First Process

The first process according to the present invention comprises providing urea in liquid form; and adding the liquid urea to a polyol.

Urea

The liquid form of the urea (or "liquid urea") may be achieved in any acceptable manner. For example, the urea may be dissolved in a first solvent. Alternatively, the urea may be melted. In yet another alternative, the urea may be suspended in a clathrate. A urea clathrate may also be known as a urea inclusion compound and may have the structure as described in "Supramolecular Chemistry" John Wiley & Sons, Jonathan w. Steed, Jerry L. Atwood, pp. 393-398 and Harris, K. D. M., "Fundamental and Applied Aspects of Urea and Thiourea Inclusion Compounds", Supramol. Chem. 2007, 19, 47-53.

The liquid form of the urea may alternatively be present in a combination of liquid forms.

In a particular embodiment, the urea is dissolved in water. In another embodiment, the urea may be dissolved in a mixture of two or more first solvents. Such first solvents include organic solvents. In an alternative embodiment, the urea is dissolved in one or more first solvents selected from water and organic alcohols. In one embodiment, urea is partially soluble in the first solvent or mixture of first solvents. In yet another embodiment, urea is fully soluble in the first solvent or mixture of first solvents.

Polyol

As used herein, the term "polyol" means an organic molecule having at least 2 —OH functionalities. As used herein, the term "polyester polyol" means a subclass of polyol that is an organic molecule having at least 2 alcohol (—OH) groups and at least one carboxylic ester ($CO_2$—C) functionality. The term "alkyd" means a subclass of polyester polyol that is a fatty acid-modified polyester polyol wherein at least one carboxylic ester functionality is preferably derived from an esterification reaction between an alcoholic —OH of the polyol and a carboxyl of a ($C_8$-$C_{60}$) fatty acid. The polyol may be any polyol; for example, the polyol may be selected from the group consisting of acrylic, styrene-acrylic, styrene-butadiene, saturated polyester, polyalkylene polyols, urethane, alkyd, polyether or polycarbonate. In one exemplary embodiment, the polyol component comprises hydroxyethyl acrylate. In another exemplary embodiment, the polyol component comprises hydroxyethyl methacrylate.

The reaction mixture may comprise from 10 to 100 percent by weight of polyol; for example, from 30 to 70 percent by weight of polyol. In one embodiment, the polyol has a functional structure of a 1,2-diol, 1,3-diol, or combinations thereof.

The polyol can be non-cyclic, straight or branched; cyclic and nonaromatic; cyclic and aromatic, or a combination thereof. In some embodiments the polyol comprises one or more non-cyclic, straight or branched polyols. For example, the polyol may consist essentially of one or more non-cyclic, straight or branched polyols.

In one embodiment, the polyol consists essentially of carbon, hydrogen, and oxygen atoms. In another embodiment, the polyol consists of primary hydroxyl groups. In yet another embodiment, the hydroxyl groups are in the 1,2 and/or 1,3 configuration. Exemplary polyol structures are shown below for illustrative purposes.

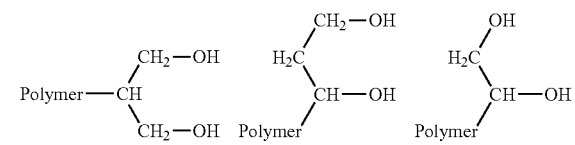

Polyol useful in embodiments of the inventive process include oligomers or polymers derived from hydroxy-containing acrylic monomeric units. Suitable monomers may be, but are not limited to, hydroxyethyl acrylate, hydroxypropyl acrylate, hydroxybutyl acrylate, hydroxydodecyl acrylate, hydroxyethyl methacrylate, hydroxypropyl methacrylate, hydroxybutyl methacrylate, hydroxydodecyl methacrylate, hydroxybutyl vinyl ether, diethylene glycol vinyl ether and a combinations thereof. The polyol useful in embodiments may be prepared by reacting at least one hydroxyl-containing monomer with one or more monomers. Suitable monomers may be, but are not limited to, vinyl monomers such as styrene, vinyl ether, such as ethyl vinyl ether, butyl vinyl ether, cyclohexyl vinyl ether, ester of unsaturated carbonic acid and dicarbonic acid, such as methyl acrylate, methyl methacrylate, ethyl acrylate, ethyl methacrylate, 2-ethylhexyl acrylate, 2-ethylhexyl methacrylate, dodecyl acrylate, dodecyl methacrylate, dimethyl maleate and a mixture thereof.

Polyols useful in certain embodiments of the inventive process include polyether polyols and polyester polyols. Suitable polyols include, for example, ethylene glycol, diethylene glycol, neopentyl glycol, 1,4-butanediol, 1,6-hexanediol, glycerol, pentaerythritol, sorbitol and mannitol. Suitable glycols thus include ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, dimethylolpropionic acid, and the like.

Polycarboxylic acids useful in the invention may include, but are not limited to, phthalic anhydride or acid, maleic anhydride or acid, fumaric acid, isophthalic acid, succinic anhydride or acid, adipic acid, azeleic acid, and sebacic acid, terephthalic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, 2,6-naphthalenedicarboxylic acid, glutaric acid, trimellitic anhydride or acid, citric acid, pyromellitic dianhydride or acid, trimesic acid, sodium sulfoisophthalic acid, as well as from anhydrides of such acids, and esters thereof, where they exist. Optionally monocarboxylic acids may be employed including, but not limited to, benzoic acid. The reaction mixture for producing alkyds includes one or more aliphatic or aromatic polycarboxylic acids, esterified polymerization products thereof, and combinations thereof. As used herein, the term "polycarboxylic acid" includes both polycarboxylic acids and anhydrides thereof. Examples of suitable polycarboxylic acids for use in the present invention include phthalic acid, isophthalic acid, terephthalic acid, tetrahydrophthalic acid, naphthalene dicarboxylic acid, and anhydrides and combinations thereof.

Addition Step

In a certain embodiment of the first process, the adding the urea in liquid form to the polyol is conducted in the presence of a catalyst. Suitable catalysts for use in this process include, but are not limited to, organo-tin compounds. The use of this type of catalyst is well known in the art. Examples of catalysts useful in the present invention include, but are not limited to, dibutyltin diacetate, and dibutyltin oxide. In a particular embodiment, the catalyst is used in an amount from 0.1% to 1.0 wt % based on polyol weight. All individual values and subranges from 0.1 to 1.0 wt % are included herein and disclosed herein; for example, the catalyst amount may range from a lower limit of 0.1, 0.2, 0.4, 0.6 or 0.8 wt % based on polyol weight to an upper limit of 0.15, 0.3, 0.5, 0.7, 0.9 or 1.0 wt % based on polyol weight. For example, the catalyst amount, in certain embodiments, may be from 0.1 to 1.0 wt % based on polyol weight, or in the alternative, from 0.5 to 1.0 wt % based on polyol weight, or in the alternative, from 0.1 to 0.6 wt % based on polyol weight.

The adding the urea in liquid form to polyol may be accomplished by any means. In a particular embodiment of the first process, the adding the urea in liquid form to the polyol is conducted in a batch manner. In a particular embodiment of the first process, the adding the urea in liquid form to the polyol is conducted in a semi-batch manner. In one embodiment, the urea in liquid form is added at a constant rate over a period of time in which the reaction proceeds. In yet another embodiment, the urea in liquid form is added to the polyol at more than one rate, with the rate changing over the time period in which the reaction proceeds. In yet another embodiment, the urea in liquid form is added to the polyol using a pulsed constant rate in which the urea is added at a rate for a first period of time, followed by a second period of no urea addition, followed by urea addition at the same rate for a third period of time, and so on. In another alternative embodiment, the urea in liquid form is added to the polyol using a pulsed variable rate in which the urea is added at a first rate for a first period of time, followed by a second period of no urea addition, followed by urea addition at a second rate for a third period of time, and so on.

In one embodiment of the first process, the polyol is complete polyol in the absence of any solvent. In an alternative embodiment of the first process, the polyol is dissolved in a second solvent prior to the adding the liquid urea to the dissolved polyol. The second solvent may be any solvent or mixture of solvents in which the polyol is soluble or partially soluble. In certain embodiments, the first and second solvents form a heterogeneous azeotrope allowing removal of the first solvent by decantation or other means. In certain embodiments, removal of the first solvent from a heterogenous azeotrope permits concurrent removal of certain by-products, such as ammonia, which are soluble in the first solvent. In yet an alternative embodiment, the first and second solvents form a heterogeneous azeotrope allowing removal of the first solvent and further wherein the second solvent is returned to the reactor.

In certain embodiments, the first process achieves at least a 50% conversion of hydroxyl groups of the polyol. All individual values and subranges from at least 50% conversion are included herein and disclosed herein; for example, the hydroxyl conversion may range from a lower limit of 50%, or in the alternative, the hydroxyl conversion may range from a lower limit of 55%, or in the alternative, the hydroxyl conversion may range from a lower limit of 60%, or in the alternative, the hydroxyl conversion may range from a lower limit of 65%, or in the alternative, the hydroxyl conversion may range from a lower limit of 70%, or in the alternative, the hydroxyl conversion may range from a lower limit of 75% or in the alternative, the hydroxyl conversion may range from a lower limit of 80%, or in the alternative, the hydroxyl conversion may range from a lower limit of 85%.

Reaction Product of First Process

In another alternative embodiment, the instant invention provides a reaction product of any of the embodiments of the first process disclosed herein.

In one embodiment, the reaction product of the first process exhibits a Gardner color of less than or equal to 2. All individual values and subranges are included herein and disclosed herein; for example, the Gardner color index may be from an upper limit of 2 or 1.

In one embodiment, the reaction product of the second process exhibits a Gardner color of less than or equal to 2. All individual values and subranges are included herein and disclosed herein; for example, the Gardner color index may be from an upper limit of 2 or 1.

In specific embodiments, a 100% solids reaction product of the first process comprises less than 0.2 wt % cyanuric acid. All individual values and subranges from less than 0.2 wt % are included herein and disclosed herein. For example, the amount of cyanuric acid may be less than 0.2 wt %, or in the alternative, less than 0.1 wt %, or in the alternative, less than 0.09 wt %, or in the alternative, less than 0.07 wt %, or in the alternative, less than 0.04 wt %, or in the alternative, less than 0.02 wt %. In a particular embodiment, the amount of cyanuric acid present in a 100% solids reaction product is from 0.05 to 0.15 wt %, or in the alternative, from 0.1 to 0.2 wt %.

In specific embodiments, a 100% solids reaction product of the first process comprises less than 0.6 wt % biuret. All individual values and subranges from less than 0.6 wt % are included herein and disclosed herein. For example, the amount of biuret may be less than 0.6 wt %, or in the alternative, less than 0.55 wt %, or in the alternative, less than 0.52 wt %, or in the alternative, less than 0.4 wt %, or in the alternative, less than 0.36 wt %, or in the alternative, less than 0.1 wt %. In a particular embodiment, the amount of biuret present in a 100% solids reaction product of the first process is from 0.35 to 0.6 wt %, or in the alternative, from 0.4 to 0.6 wt %, or in the alternative, from 0.01 to 0.1 wt %.

In specific embodiments, a 100% solids reaction product of the first process comprises less than 2 wt % polyallophanate. All individual values and subranges from less than 2 wt % are included herein and disclosed herein. For example, the amount of polyallophanate present in a 100% solids reaction product is less than 2 wt %, or in the alternative, less than 1.8 wt %, or in the alternative, less than 1.0 wt %, or in the alternative, less than 0.6wt %, or in the alternative, less than 0.3 wt %, or in the alternative, less than 0.1 wt %. In a particular embodiment, the amount of polyallophanate present in a 100% solids reaction product of the first process is from 0.3 to 2 wt %, or in the alternative, from 0.55 to 0.15 wt %., or in the alternative, from 0.01 to 0.05 wt %.

Second Process

In an alternative embodiment, the instant invention further provides a second process for producing polycarbamate comprising adding solid urea to a polyol in liquid form to form a reaction mixture.

Polyols suitable for use in the second process are identical to those discussed in connection with the first process. The liquid form of the polyol may arise from any means, such as, by dissolution in a solvent, a non-dissolved yet liquid polyol or by melting.

In one specific embodiment, the temperature of the reaction mixture is above the melting point of urea.

In one embodiment of the second process, the adding the solid urea is conducted in a batch manner. In yet another embodiment of the second process, the adding the solid urea to the polyol is conducted in a semi-batch manner. In one embodiment, the urea is added at a constant rate over a period of time in which the reaction proceeds. In yet another embodiment, the urea is added to the polyol at more than one rate, with the rate changing over the time period in which the reaction proceeds. In yet another embodiment, the urea is added to the polyol using a pulsed constant rate in which the urea is added at a rate for a first period of time, followed by a second period of no urea addition, followed by urea addition at the same rate for a third period of time, and so on. In another alternative embodiment, the urea is added to the polyol using a pulsed variable rate in which the urea is added at a first rate for a first period of time, followed by a second period of no urea addition, followed by urea addition at a second rate for a third period of time, and so on.

In a certain embodiment of the second process, the adding the urea to the polyol is conducted in the presence of a catalyst. Suitable catalysts for use in this process include, but are not limited to, organo-tin compounds. The use of this type of catalyst is well known in the art. Examples of catalysts useful in the present invention include, but are not limited to, dibutyltin diacetate, and dibutyltin oxide. In a particular embodiment, the catalyst is used in an amount from 0.1% to 1.0 wt % based on polyol weight. All individual values and subranges from 0.1 to 1.0 wt % are included herein and disclosed herein; for example, the catalyst amount may range from a lower limit of 0.1, 0.2, 0.4, 0.6 or 0.8 wt % to an upper limit of 0.15, 0.3, 0.5, 0.7, 0.9 or 1.0 wt %. For example, the catalyst amount, in certain embodiments, may be from 0.1 to 1.0 wt %, or in the alternative, from 0.5 to 1.0 wt %, or in the alternative, from 0.1 to 0.6 wt %.

In another alternative embodiment, the instant invention provides a reaction product of any of the embodiments of the second process disclosed herein.

In one embodiment, the reaction product of the second process exhibits a Gardner color of less than or equal to 2. All individual values and subranges are included herein and disclosed herein; for example, the Gardner color index may be from an upper limit of 2 or 1.

In specific embodiments, a 100% solids reaction product of the second process comprises less than 0.2 wt % cyanuric acid. All individual values and subranges from less than 0.2 wt % are included herein and disclosed herein. For example, the amount of cyanuric acid present in the 100% solids reaction product is less than 0.2wt %, or in the alternative, less than 0.1 wt %, or in the alternative, less than 0.09 wt %, or in the alternative, less than 0.07 wt %, or in the alternative, less than 0.04 wt %, or in the alternative, less than 0.02 wt %. In a particular embodiment, the amount of cyanuric acid present in the 100% solids reaction product is from 0.01 to 0.2 wt %, or in the alternative, from 0.1 to 0.2 wt %.

In specific embodiments, a 100% solids reaction product of the second process comprises less than 0.6 wt % biuret. All individual values and subranges from less than 0.6 wt % are included herein and disclosed herein. For example, the amount of biuret present in the 100% solids reaction product is less than 0.6 wt %, or in the alternative, less than 0.55 wt %, or in the alternative, less than 0.52 wt %, or in the alternative, less than 0.4 wt %, or in the alternative, less than 0.36 wt %. In a particular embodiment, the amount of biuret present in the 100% solids reaction product of the second process is from 0.35 to 0.4 wt %, or in the alternative, from 0.35 to 0.38 wt %.

In specific embodiments, a 100% solids reaction product of the second process comprises less than 2 wt % polyallophanate. All individual values and subranges from less than 2 wt % are included herein and disclosed herein. For example, the amount of polyallophanate present in the 100% solids reaction product is less than 2 wt %, or in the alternative, less than 1.8 wt %, or in the alternative, less than 1.0 wt %, or in the alternative, less than 0.6wt %, or in the alternative, less than 0.3 wt %. In a particular embodiment, the amount of polyallophanate present in the 100% solids reaction product of the second process is from 0.25 to 1.2 wt %, or in the alternative, from 0.26 to 0.75 wt %.

EXAMPLES

The following examples illustrate the present invention but are not intended to limit the scope of the invention.

Example 1

Batch Process to Produce Polycarbamate from Reaction of Urea and Polyol

A 1-L reactor with heating mantle was used in the reaction. The reactor was equipped with an agitator, a thermal-couple and a nitrogen sparger. A water-cooled condenser was connected to the adaptor on the reactor lid. The overhead condensate was collected by a receiver and the non-condensable went through a bubbler filled with mineral oil and then entered a 1-L scrubber filled with water.

850 g PARALOID™ AU-608X polyol which consists of 58% solid and 42% solvent (xylenes) was added to the reactor. PARALOID AU-608X is an acrylic polyol which is commercially available from The Dow Chemical Company. The polyol used in Inventive Example 1 has 0.76 mol hydroxyl functionality. 5.20 g dibutyltin oxide (98% pure) was added to the reactor. 45.87 g 99% pure urea was used in this reaction. The heating mantle was started and set at 158° C. The nitrogen sparging flow rate was set at 20 sccm. The reaction mixture was agitated at 100 rpm and then adjusted to 400 rpm when the reactor temperature was over 60° C. Urea was added to the reactor when the reactor temperature was over 130° C. The reaction was carried out at 138-142° C. for 12 hours. After the reaction was complete, the heating mantle was shut down and the agitation rate was reduced to 60 rpm. When the reactor temperature dropped to 60° C., the polycarbamate product was poured out from the reactor. The final product was analyzed using $^{13}$C NMR. 800.6 g polycarbamate with hydroxyl conversion of 82.3% was obtained. The starting polyol was clear and colorless. The polycarbamate product had a Gardner color of 3 and further contained solid particles. By microscopic examination, the solid particles were amorphous in shape and had a size ranging from 5 to 60 μm across the largest dimension. By-product concentration was measured based upon the 100% solids product weight. Table 1 provides the results of by product testing.

TABLE 1

| Biuret (wt % in 100% solids product) | Cyanuric Acid (wt % in 100% solids product) | Polyallophanate (wt % in p100% solids product) | Biuret + Cyanuric acid + polyallophate (wt % in 100% solids product) |
|---|---|---|---|
| 0.47% | 0.10% | 1.70% | 2.27% |

Example 2

Semi-Batch Process to Produce Polycarbamate from Solid Urea and Polyol

A 1-L reactor with heating mantle was used in this reaction. The reactor had a glass agitator at the center neck on the lid and a nitrogen sparger to the bottom of the reactor. The reactor temperature was measured using a thermal couple. A water-cooled condenser was connected to the adaptor on the reactor lid. The overhead condensate was collected by a receiver and the non-condensable went through a bubbler filled with mineral oil and then entered a 1-L scrubber filled with water.

929.35 g polyol PARALOID™ AU-608X which consists of 58% solid and 42% solvent (xylenes) was added to the reactor, which had 0.83 mol hydroxyl functionality. 5.69 g dibutyltin oxide (98% pure) was added to the reactor. 52.9 g 99% pure urea was used for this reaction. The heating mantle was started and set at 158° C. The nitrogen sparging flow rate was set at 20 sccm. The reaction mixture was agitated at 100 rpm and then adjusted to 400 rpm when the reactor temperature was over 60° C.

Urea was added to the reactor using a semi-batch method. When the reactor temperature was over 130° C., 60% of the total urea (31.7 g) was added to the reactor. The reaction was carried out at 138-142° C. The rest 40% of total urea (21.2 g) was added into the reactor in 4 equal portions (10% of the total urea each portion, 5.02 g) at 5 hrs, 9.5 hrs, 13.5 hrs and 16.5 hrs. The total reaction time was 20 hours. After the reaction was complete, the heating mantle was shut down and the agitation rate was reduced to 60 rpm. When the reactor temperature dropped to 60° C., the polycarbamate product was poured out from the reactor. The final product was analyzed using $^{13}$C NMR. 915.0 g polycarbamate with hydroxyl conversion of 85.6% was obtained.

The starting polyol was clear and colorless. The polycarbamate product had a Gardner color of 2 and no solid particles were detected visually or by microscopic examination. By-product concentrations were measured based upon the 100% solids polycarbamate product weight. Table 2 provides the results of by product testing.

TABLE 2

| Biuret (wt % in 100% solids product) | Cyanuric Acid (wt % in 100% solids product) | Polyallophanate (wt % in 100% solids product) | Biuret + Cyanuric acid + polyallophate (wt % in 100% solids product) |
|---|---|---|---|
| 0.35% | 0.01% | 0.26% | 0.62% |

Example 3

Semi-Batch Process to Produce Polycarbamate from Aqueous Urea Solution and Polyol A 1-L reactor with heating mantle was used in this reaction. The reactor had a glass agitator at the center neck on the lid and a nitrogen sparger to the bottom of the reactor. The reactor temperature was measured using a thermal couple. A water-cooled condenser was connected to the adaptor on the reactor lid. The overhead condensate was collected by a receiver and the non-condensable went through a bubbler filled with mineral oil and then entered a 1-L scrubber filled with water. A syringe pump with accurate feeding rate was used for urea aqueous solution feeding. Another syringe pump was used for solvent recycling.

800.1 g polyol PARALOID™ AU-608X which consists of 58% solid and 42% solvent (xylenes) was added to the reactor, which had 0.71 mol hydroxyl functionality. 4.90 g dibutyltin oxide (98% pure) was added to the reactor. 100.0 g xylenes was added to the reactor to keep a low viscosity for the reaction. The heating mantle was started and set at 158° C. The nitrogen sparging flow rate was set at 20 sccm. The reaction mixture was agitated at 100 rpm and then adjusted to 400 rpm when the reactor temperature was over 60° C.

43.17 g 99% pure urea was dissolved in 40.0 g deionized water to form a urea aqueous solution. The solution was charged into a syringe. When the reactor temperature reached 140° C., the syringe pump was started at 2 ml/min for a period of 10 minutes 51 seconds, during which 30% of total urea solution (21.7 ml) was fed into the reactor. The pump feeding was stopped. When the reaction time reached 3 hrs 10 minutes, the pump feeding was started at 40 ml/hr for approximate 38 minutes to add 35% urea solution (25.3 ml) to the reactor. The pump was then stopped. When the reaction time reached 8 hrs, the pump feeding was started at 5 ml/hr for the rest 35% urea solution (25.3 ml). At reaction time of 13 hrs, urea solution feed was complete. During urea aqueous solution feeding, an azeotrope of water and xylenes was collected in the overhead receiver. The overhead liquid was collected and separated every hour from the receiver. The xylenes phase was rinsed with equal mass of deionized water and pumped back to the reactor.

The total reaction time was 17 hours. After the reaction was complete, the heating mantle was shut down and the agitation rate was reduced to 60 rpm. When the reactor temperature dropped to 60° C., the polycarbamate product was poured out from the reactor. The final product was analyzed using $^{13}$C NMR. 804 g polycarbamate with hydroxyl conversion of 80.4% was obtained.

The starting polyol was clear and colorless. The polycarbamate product had a Gardner color of less than or equal to 1 and no solid particles were detected visually or by microscopic examination. By-product concentrations were measured based upon the 100% solids polycarbamate product weight. Table 3 provides the results of by product testing.

TABLE 3

| Biuret (wt % in 100% solids product) | Cyanuric Acid (wt % in 100% solid product) | Polyallophanate (wt % in 100% solids product) | Biuret + Cyanuric acid + polyallophate (wt % in 100% solids product) |
|---|---|---|---|
| 0.05% | 0.01% | 0.03% | 0.09% |

Test Methods

Test methods include the following:
OH Number Titration

Where OH number is the magnitude of the hydroxyl number for a polyol as expressed in terms of milligrams potassium hydroxide per gram of polyol (mg KOH/g polyol). Hydroxyl number (OH #) indicates the concentration of hydroxyl moieties in a composition of polymers, particularly polyols. The hydroxyl number for a sample of polymers is determined by first titrating for the acid groups to obtain an acid number (mg KOH/g polyol) and secondly, acetylation with pyridine and acetic anhydride in which the result is obtained as a difference between two titrations with potassium hydroxide solution, one titration with a blank for reference and one titration with the sample. A hydroxyl number is the weight of potassium hydroxide in milligrams that will neutralize the acetic anhydride capable of combining by acetylation with one gram of a polyol plus the acid number from the acid titration in terms of the weight of potassium hydroxide in milligrams that will neutralize the acid groups in the polyol. A higher hydroxyl number indicates a higher concentration of hydroxyl moieties within a composition. A description of how to determine a hydroxyl number for a composition is well-known in the art, for example in Woods, G., The ICI Polyurethanes Book, $2^{nd}$ ed. (ICI Polyurethanes, Netherlands, 1990).

Gardner color: was measured according to ASTM D1544 "Standard Test Method for Color of Transparent Liquids (Gardner Color Scale)" using a HunterLab colorimeter.

$^{13}$C NMR: All samples were characterized by $^{13}$C NMR in solutions. For a typical sample preparation, 0.6 g dry material was dissolved in 2.5 mL DMSO-$d_6$ solvent at room temperature in a glass vial. The DMSO-$d_6$ solvent contains 0.015 M Cr(acac)$_3$ as a relaxation agent. The solution was then transferred to a 10 mm NMR tube for characterization. Quantitative inverse-gated $^{13}$C NMR experiments were performed on a Bruker Avance 400 MHz ($^1$H frequency) NMR spectrometer equipped with a 10 mm DUAL C/H cryoprobe. All experiments were carried out without sample spinning at 25.0° C. Calibrated 90° pulse was applied in the inverse-gated pulse sequence. The relaxation delay between consecutive data acquisitions is 5*$T_1$, where $T_1$ is the longest spin-lattice relaxation time of all nuclei in the measured system. The $^{13}$C NMR spectra were processed with a line broadening of 1 Hz, and referenced to 39.5 ppm for the DMSO-$d_6$ resonance peak.

Information that can be obtained from $^{13}$C NMR spectra includes the percent of hydroxyl conversion, byproduct levels and solid content of the reaction product. The carbon next to a hydroxyl group has a chemical shift change after the carbamylation reaction. The hydroxyl conversion was calculated from the peak intensity ratio of the carbon after and before a carbamylation reaction. In a quantitative $^{13}$C NMR spectrum, each component of the measured system has a unique resonance peak, and its peak intensity is proportional to the molar concentration of that species. The byproduct levels and solid content were calculated by integrating the desired peaks. The molar concentration can be converted to weight percentage if the molecular weights for all species are known. In calculating the solid content, any components other than known solvents are classified as solid.

The present invention may be embodied in other forms without departing from the spirit and the essential attributes thereof, and, accordingly, reference should be made to the appended claims, rather than to the foregoing specification, as indicating the scope of the invention.

We claim:

1. A process to produce polycarbamate comprising:
   providing urea in liquid form, wherein said urea is dissolved in water; and
   adding the liquid urea to a polyol;
   wherein the polyol is dissolved in a solvent;
   wherein the polyol is selected from the group consisting of acrylic, styrene-acrylic, styrene-butadiene, saturated polyester, polyalkylene polyols, urethane, alkyd, polyether and polycarbonate; and
   wherein said process produces a polycarbamate characterized by the following:
   (i) comprising less than 0.2 wt % cyanuric acid;
   (ii) comprising less than 0.6 wt % biuret;
   (iii) comprising less than 2 wt % polyallophanate; and
   (iv) exhibiting a Gardner color of less than or equal to 2.

2. The process according to claim 1, wherein the adding the liquid urea to the polyol is conducted in a semi-batch manner and wherein the liquid urea is added to the polyol at a constant, pulsed, or variable rate of addition.

3. The process according to claim 1, wherein the adding the liquid urea to the polyol is conducted in the presence of a catalyst.

4. The process according to claim 1 wherein the water and solvent form a heterogeneous azeotrope allowing removal of the water and the solvent being returned to the reactor.

5. The process according to claim 4 wherein the removal of the water is by decantation.

* * * * *